(12) United States Patent
Ruben

(10) Patent No.: US 6,898,857 B2
(45) Date of Patent: May 31, 2005

(54) FRUIT PEELER

(76) Inventor: Steven D. Ruben, 43 Bay Dr., Key West, FL (US) 33040

( * ) Notice: Subject to any disclaimer, the term of this patent is extended or adjusted under 35 U.S.C. 154(b) by 0 days.

(21) Appl. No.: 10/674,310

(22) Filed: Sep. 30, 2003

(65) Prior Publication Data

US 2005/0066529 A1   Mar. 31, 2005

(51) Int. Cl.⁷ .......................... A47J 25/00; A47J 43/28
(52) U.S. Cl. .................. 30/325; 30/149; 30/113.1
(58) Field of Search ................. 30/113.1, 113.3, 30/143, 324, 325, 328, 149; D7/693, 647, D7/678; 241/95; 99/495, 510

(56) References Cited

U.S. PATENT DOCUMENTS

| | | | | |
|---|---|---|---|---|
| 724,246 A | * | 3/1903 | Bentley | 30/325 |
| 791,815 A | | 6/1905 | Pollock | |
| 885,444 A | * | 4/1908 | Cram | 30/325 |
| 908,894 A | | 1/1909 | Smiley | |
| D45,189 S | * | 2/1914 | Ford | D7/647 |
| 1,272,506 A | * | 7/1918 | Olander | 30/325 |
| 1,288,617 A | * | 12/1918 | Kupiszweski | 30/324 |
| 1,438,418 A | * | 12/1922 | Woods | 30/113.1 |
| 1,452,464 A | * | 4/1923 | Isaacs | 30/325 |
| 1,982,193 A | * | 11/1934 | Darr | 30/123.6 |
| 2,778,109 A | * | 1/1957 | Haynes | 30/324 |
| 2,814,868 A | * | 12/1957 | Wellinger | 30/124 |
| 3,004,341 A | * | 10/1961 | Carroll et al. | 30/325 |
| 3,154,418 A | * | 10/1964 | Lovell et al. | 30/325 |
| D205,539 S | | 8/1966 | Latham | |
| 4,037,793 A | | 7/1977 | Puustinen | |
| 4,290,197 A | | 9/1981 | Zaroor | |
| 4,524,513 A | * | 6/1985 | Intini, Jr. | 30/149 |
| D410,823 S | | 6/1999 | Abrams | |
| D421,698 S | | 3/2000 | Wang | |
| 6,324,969 B1 | | 12/2001 | Harding | |

* cited by examiner

*Primary Examiner*—Hwei-Siu Payer
(74) *Attorney, Agent, or Firm*—Connolly Bove Lodge & Hutz LLP

(57) ABSTRACT

A hand utensil for peeling and pitting a fruit, such as a mango, has a spoon-shaped bowl through which a plurality of elongated generally parallel slots laterally extend in a lower region of the concave surface between the proximal end and the distal end of the bowl. In addition, a series of arcuate ridges project from the concave surface of the bowl, wherein each arcuate ridge has a radius of curvature extending from a center point on a longitudinal axis defined by the bowl.

9 Claims, 2 Drawing Sheets

FRUIT PEELER

FIELD OF THE INVENTION

The present invention relates to a hand utensil or peeler particularly useful for removing fruit peels and pits, such as the peels and pits of mangoes.

BACKGROUND OF THE INVENTION

Mangoes have a tough outer skin or peel that must be removed before one may enjoy this sweet fruit. In addition, mangoes have a hard and inedible inner pit, and the edible fruit must be separated from this pit.

Mangoes are usually peeled with a conventional knife, such as by slitting the peel along a plurality of semi-circular arcs to form separate peel sections and then removing each such peel section. Frequently, the fruit is scored laterally around so that it may be split into two halves, with the pit in one half. The edible fruit is scraped away from the pit and from the peel with a knife or spoon. In view of the generally convex outer mango peel surface and the generally convex outer surface of the pit, it has been difficult to separate the fruit from the peel and the pit without sacrificing some of the fruit. Moreover, mangoes are particularly juicy, and the edible flesh is particularly slippery to handle. With prior peeling utensils some of the juice is wasted as the fruit is peeled. Hand utensils directed specifically to overcoming such problems associated with peeling mangoes have not been available.

U.S. Pat. No. 6,324,969 B1 shows a peeler for fruits and vegetables that includes a U-shaped peeling blade and a feeder that grips the fruit and urges the fruit past the U-shaped peeling blade. The feeder has a pair of gear wheels mounted for rotation, and may have other complex moving parts. The peeler apparatus is indicated as most suitable for peeling melons, but also may be used to peel eggplants, papayas and mangoes.

U.S. Pat. No. 791,815 shows a fruit pitter and parer with a rounded scoop having a diamond-point piercing tool at its distal end. The rounded scoop is attached at its proximal end to a handle. This hand utensil is suggested for use for pitting and paring peaches and apples.

U.S. Pat. No. 908,894 describes a tomato knife with a blade portion that has a curved spoon shape terminating at the distal end into a sharp V-shaped point.

U.S. Patent No. Des. 205,539 shows a spoon with a series of oval slots oriented in two columns, each with four rows, formed in the bowl portion of the spoon.

U.S. Pat. No. 4,290,197 discloses a hand utensil that may be used to peel citrus fruit, such as oranges. The tool has a blade-like member having a pair of parallel, spaced rod-shaped arms converging together at the outer curved tip 8 at the distal end. A curved cutting element 10 is formed in a transversely extending strip fixed between the parallel spaced arms, and is used to score the fruit peel. Once the peel is scored, the outer curved tip 8 can be inserted under the peel and used to separate the peel from the fruit. A blade 20 is also provided to scrape the citrus fruit after the peel has been removed.

There is a need for a lower cost, convenient and efficient hand utensil specifically useful for peeling mangoes.

SUMMARY OF THE INVENTION

A first aspect of the invention is a hand utensil for peeling and pitting a fruit, such as a mango. The utensil is shaped similar to a spoon. The spoon-shaped bowl has a proximal end and a distal end, and defines a longitudinal axis extending from the proximal end to the distal end. The bowl further has a convex lower surface and concave upper surface. Preferably, the bowl has an average thickness of between 2 and 4 mm, and is formed from stainless steel.

A plurality of slots extend through the bowl in a lower region of the concave surface between the proximal end and the distal end of the bowl. The slots preferably are elongated and oriented generally perpendicularly to the longitudinal axis.

In addition, a series of arcuate ridges project from the concave surface of the bowl. Preferably, a first arcuate ridge in the series of arcuate ridges is formed at or near the distal end of the bowl. Preferably, each arcuate ridge of the series of arcuate ridges is evenly spaced apart from an adjacent arcuate ridge. Most preferably, each arcuate ridge has a radius of curvature between about 2 and 6 cm, with a center point of such radius of curvature along the longitudinal axis of the bowl. Most preferably, the arcuate ridges are spaced apart with a pitch of from 4 to 6 mm, a face angle (A) between 5 and 20 degrees as measured from an axis taken perpendicular to the convex surface of the bowl below the ridge, and have a depth of cut of from ⅓ to ½ the thickness of the bowl.

Preferably, the proximal end of the bowl terminates to form a shank or rod that is inserted into an axial opening formed in a handle to attach the bowl to the handle. In such embodiment, the handle forms an internal axial core opening to receive the shank, and a tapered flange or other sealing means holds the shank within the handle. Preferably, the handle is formed from rubber or another dish-washer safe material, and is shaped to be held comfortably.

DESCRIPTION OF THE DRAWINGS

FIG. 3 is a top plan view thereof;

FIG. 4 is a bottom plan view thereof;

DESCRIPTION OF THE PREFERRED EMBODIMENTS

Referring first to FIGS. 1 to 4, a hand utensil 10 for peeling and pitting a mango or other pitted fruit has a handle 12, a spoon-shaped bowl 20, and a shank 22. The handle is formed from a dish-washer safe, food-grade material, such as rubber or a moldable polymer.

Figure 1:
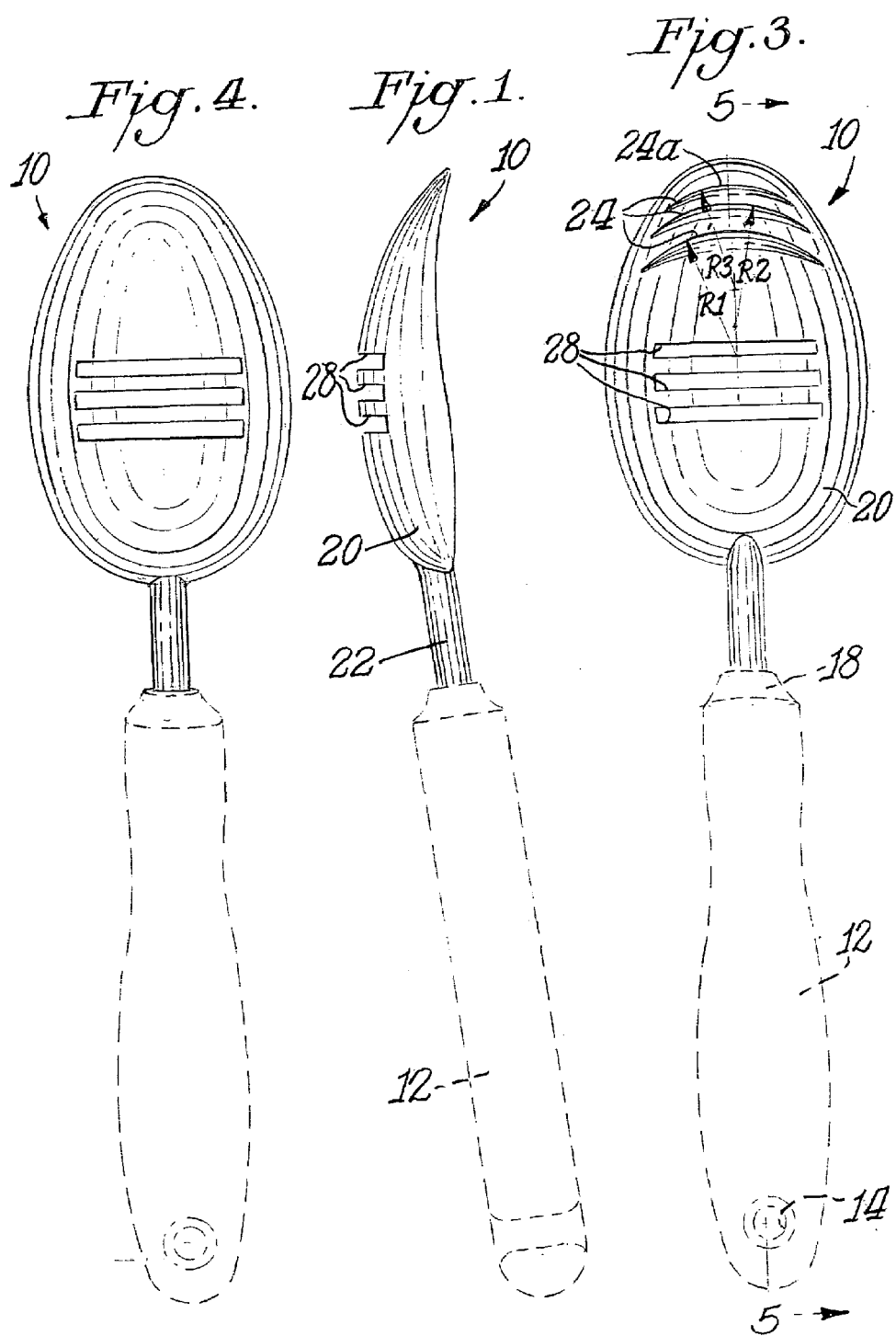
FIG. 1 is a left side elevational view of the hand utensil/fruit peeler of this invention, wherein the right side elevational view is a mirror image.
Figure 2:
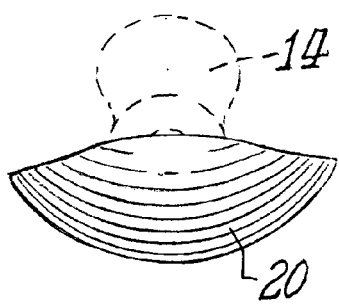
FIG. 2 is a front end elevational view thereof.
Figure 5:
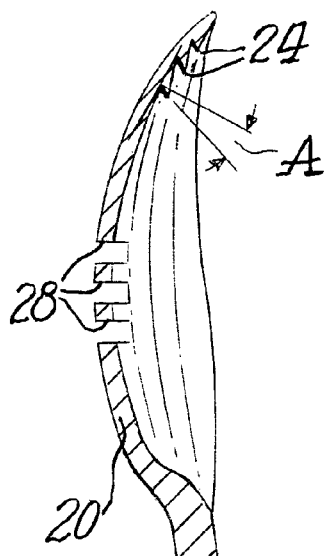
FIG. 5 is a cross sectional view in side elevation taken along line 5—5 of FIG. 3.

As shown in FIGS. 3, 4 and 5, the handle 12 defines a mounting hole or hanger eye 14 near its proximal end. The handle further defines a hollow core or bore (not shown) along its longitudinal axis into which the shank 22 is inserted to attach the spoon-shaped bowl 20 to the handle 12. A flange or fitting 18 is crimped around the shank 22 and the distal end of the handle 12 to maintain the connection between the shank 22 and handle 12. Preferably, an adhesive or other sealant is applied to the shank 22 before it is inserted into the bore. In the preferred embodiment, the shank 22 is formed to be generally cylindrical with a diameter of 5 mm. Other shank cross-sectional shapes and dimensions may be used.

The spoon-shaped bowl 20 has a concave upper surface and a convex lower surface. The bowl 20 further has a proximal end that terminates at shank 22, and a distal end. The bowl 20 defines a central, longitudinal axis from its proximal end to its distal end, which is along line 5—5 in FIG. 3. The bowl 20 preferably is formed from a dishwasher safe, food-grade material, such as stainless steel, such as cutlery grade stainless SAE 51335. Preferably, the spoon-shaped bowl 20 is molded together integrally with the shank 22 of the same material, but other fabricating methods may be used. For example, the shank 22 may be a rod that is attached to the proximal end of the bowl 20 by welding or other adhering means. The bowl 20 generally has an average thickness of between 2 and 4 mm.

As shown in FIGS. 3 and 5, arcuate ridges 24 project from the concave upper surface of the bowl 20 to form a series of such ridges. A first arcuate ridge 24a in the series of arcuate ridges 24 preferably is formed at or nearest to the distal end of the bowl 20. As illustrated in the preferred embodiment, each arcuate ridge 24 of the series of arcuate ridges is evenly spaced apart from an adjacent arcuate ridge. Each arcuate ridge has a radius of curvature R between about 2 and 6 cm, with a center point of such radius of curvature along the longitudinal axis of the bowl 20. Preferably, the radius of curvature for each arcuate ridge is about 2.54 cm or 1 inch. In the embodiment shown in FIG. 3, R1 is 2.38 cm, R2 is 2.54 cm and R3 is 2.22 cm. As shown best in FIG. 5, the arcuate ridges 24a, 24 are spaced apart, each with a pitch of about 5 mm, a face angle A of between 5 and 20 degrees as measured from an axis taken perpendicular to the convex surface of the bowl below the ridge, and have a depth of cut of from ⅓ to ½ the thickness of the bowl. Preferably, the ridges are cut into a pre-molded spoon-shaped bowl so as to have sharper points. Alternatively, the bowl may be molded to form ridges in the concave inner bowl surface. Other fabricating methods may be used.

While the preferred embodiment shows three ridges 24a, 24, two or more ridges can be used with good results. The ridges score and remove the mango skin and also scrape and separate edible flesh of the fruit from the pit.

Referring next to FIGS. 3, 4 and 5, a plurality of slots 28 are pierced through the thickness of a central portion of the bowl 20. The slots 28 extend generally laterally and generally perpendicular to the longitudinal axis defined by the bowl 20. In FIG. 4, the plurality of slots 28 comprises three elongated slots 28 that are spaced apart and oriented parallel to one another. The slots 28 have a width or slot opening of from 2 to 4 mm, preferably about 3 mm, and a length of from 2.5 to 4 cm. The slots may be cut into a pre-molded spoon-shaped bowl, or the bowl may be molded to have slots.

While the preferred embodiment shows three slots 28, two or more slots can be used with good results. The slots permit some of the juice to drain from the edible flesh of the fruit as it is being separated from the pit.

To peel a mango with the utensil according to the invention, first slice off the stem portion of the mango at one end to expose the mango pit in the core of the fruit. Slicing may be with a knife 30 integral with the utensil 10 or with a knife (not shown) that is separate from the utensil 10. Second, place the distal end or tip (e.g., 24a) of the utensil 10 onto the flat top surface of the mango pit. Holding the mango in one hand and the utensil in the other, the user forces the utensil into the mango with the bowl directed toward the pit and while keeping the tip in contact with the surface of the mango pit. The bowl 20 of the utensil 10 is urged along the surface of the pit to separate the edible fruit from the pit. After completing a stroke along the length of the pit, the user oscillates the bowl 20 of the utensil 10 around the pit surface left and right to ensure that the fruit has been separated from the pit. Third, remove the utensil from the mango. Fourth, rotate the mango about 180 degrees and reinsert the utensil to repeat the scraping action along the opposite surface of the pit to separate the edible fruit from that surface. Fifth, pry out the pit. Sixth, place the tip of the utensil at the edge of the mango skin/peel and scrape the edible fruit away from the skin/peel while rotating the mango.

Figure 6:
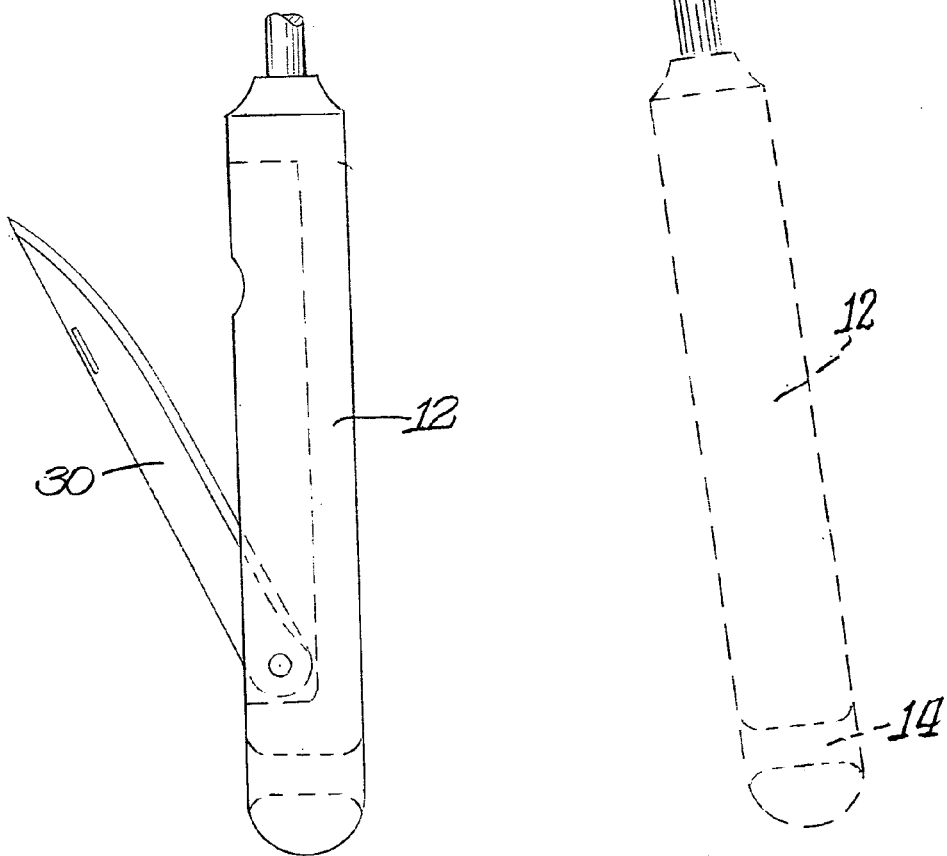
FIG. 6 is a partial left side elevational view of an alternate embodiment of the hand utensil/fruit peeler of this invention.

In an alternate embodiment shown in FIG. 6, a folding or retractable knife 30 may be disposed within the handle 12. Such knife 30 can be used to cut off the stem portion of the mango or other fruit to expose the pit or core that may then be removed using the bowl portion of the utensil.

While the preferred embodiment has greatest advantage in use for peeling and pitting mangoes, this hand utensil may also be used to peel and pit other fruits and vegetables.

The invention has been illustrated by detailed description of the preferred embodiments. Various changes in form and detail will be within the skill of persons skilled in the art. Therefore, the invention must be measured by the claims and not by the description of the preferred embodiments.

I claim:

1. A hand utensil for peeling and pitting a fruit, such as a mango, comprising:
    a spoon-shaped bowl having a proximal end and a distal end and defining an axis extending from the proximal end to the distal end, said bowl having a convex surface and concave surface, and wherein said bowl defines a plurality of elongated slots extending therethrough in a lower region of the concave surface and between the proximal end and distal end of the bowl and oriented generally perpendicularly to said axis and generally parallel to one another; and
    a series of arcuate ridges projecting from the concave surface of the bowl, wherein a first arcuate ridge in the series of arcuate ridges is formed at the distal end of the bowl, and a last arcuate ridge in the series of arcuate ridges is formed between the proximal end and distal end of the bowl, and further wherein the last arcuate ridge is spaced apart from the plurality of elongated slots extending through the bowl.

2. The hand utensil of claim 1, further comprising a handle and means for engaging the spoon-shaped bowl to the handle.

3. The hand utensil of claim 2, wherein the proximal end of the bowl attaches to or is formed into a shank that is inserted into a portion of the handle.

4. The hand utensil of claim 2, further comprising a retractable knife blade disposed within the handle.

5. The hand utensil of claim 1, wherein each arcuate ridge of the series of arcuate ridges is evenly spaced apart from an adjacent arcuate ridge.

6. The hand utensil of claim 5, wherein the arcuate ridges are spaced apart with a pitch of from 4 to 6 mm.

7. The hand utensil of claim 5, wherein the bowl has an average thickness of between 2 and 4 mm, and the ridges have a depth of cut of from ⅓ to ½ the thickness of the bowl.

8. The hand utensil of claim 5, wherein the ridges are cut to have a face angle between 5 and 20 degrees as measured from an axis taken perpendicular to the convex surface of the bowl below the ridge.

9. The hand utensil of claim 1, wherein each arcuate ridge has a radius of curvature, and a center point for such radius of curvature is along the axis of the bowl, and the radius of curvature is between about 2 and 6 cm.

* * * * *